United States Patent Office 3,434,388
Patented Mar. 25, 1969

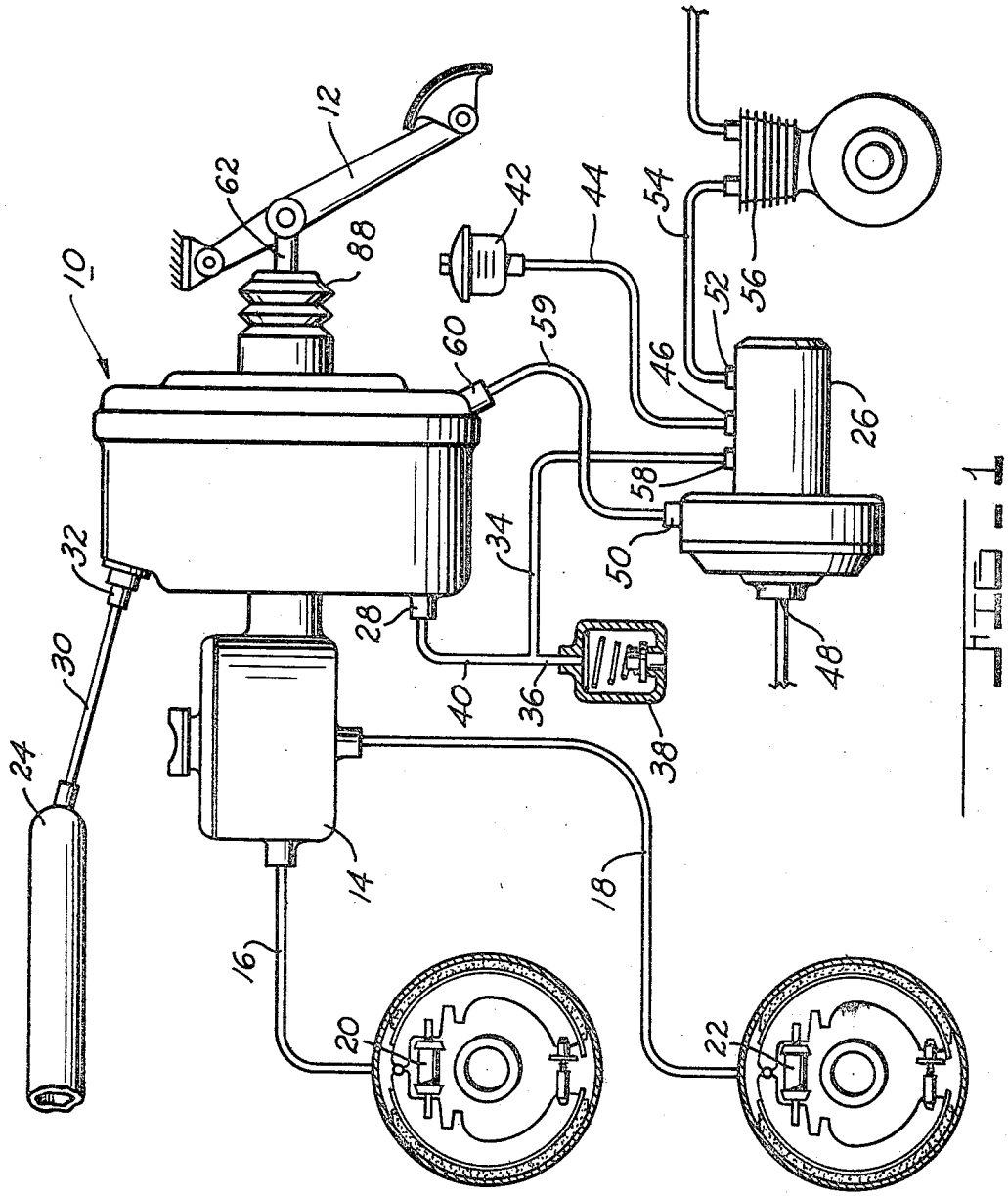

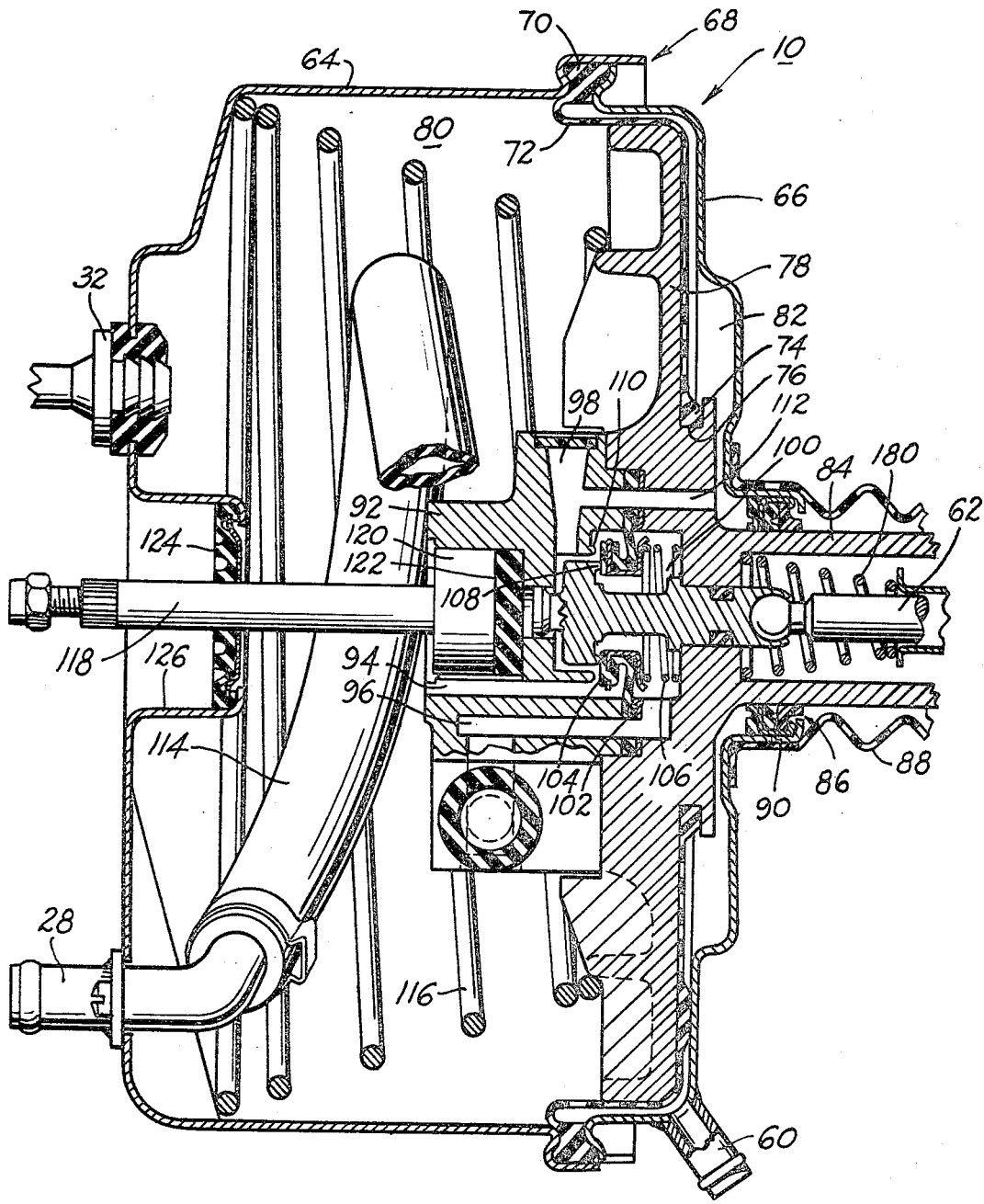
FIG_2

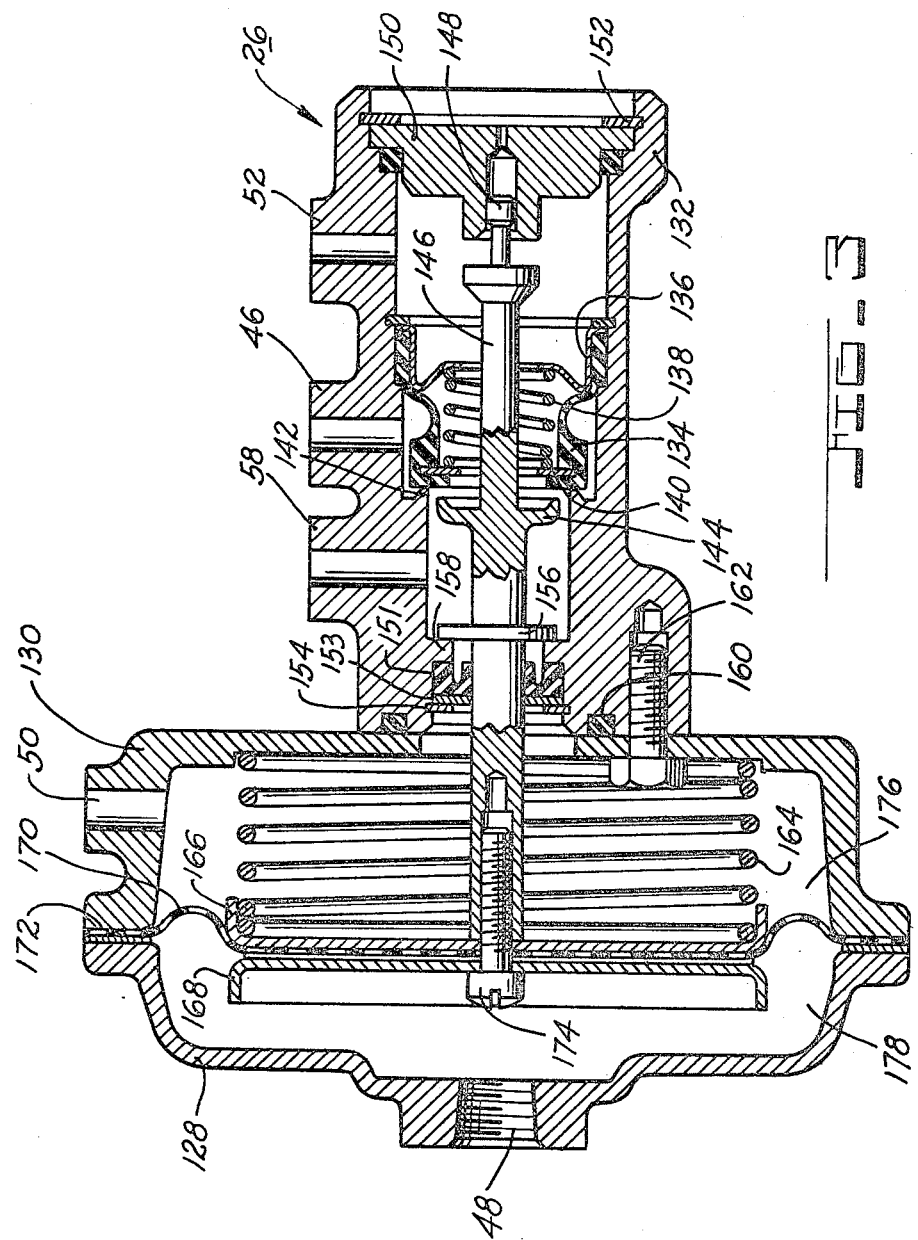

3,434,388
SERVOMOTOR CONTROL MEANS WITH PRIMARY
AND SECONDARY PRESSURE SOURCES
Thomas M. Julow and Charlie N. French, South Bend,
Ind., assignors to The Bendix Corporation, a corporation of Delaware
Filed Mar. 17, 1967, Ser. No. 623,936
Int. Cl. F01b 29/00, 25/04
U.S. Cl. 91—6    7 Claims

ABSTRACT OF THE DISCLOSURE

A servomotor control system having means utilizing primary and secondary pressure sources with means to change over to the secondary pressure source as the output of the servomotor approaches power run-out for the primary source.

Summary

In present day servomotors such as the pneumatic type employed in automobile power brakes, it has become necessary with the need for higher brake line pressure required by disc brakes to provide larger servomotors or within the overall size of present day units to increase the output performance. Needless to say that the former of these solutions presents a larger unit for a space which by necessity is decreasing in size. Therefore, the dictates of consumers is such as to employ other means to develop higher power boost. This solution appears by this invention and resides in providing an automatic means to change over, at the point of power run-out for atmospheric control pressure, to a supply of superatmospheric air, such as is available from smog pumps or air pumps employed with pressure leveling devices in the vehicle suspension systems. With such a system of utilizing atmospheric pressure and superatmospheric pressure, this invention provides means whereby the output of a power brake servomotor can substantially double the line pressure for the vehicle brakes within the same size of today's servomotors.

Drawing description

FIGURE 1 is a schematic presentation employing the principles of this invention;

FIGURE 2 is a cross sectional view of the servomotor of FIGURE 1; and

FIGURE 3 is a cross sectional view of a pressure responsive valve according to the principles of this invention as employed in the system of FIGURE 1.

Detailed description

With regard now to the description of FIGURE 1 there is shown a pneumatic type fluid pressure servomotor 10 operated by a brake pedal 12 for pressurizing a master cylinder 14 delivering hydraulic pressure via lines 16 and 18 to wheel cylinders 20 and 22, respectively for actuating the brake shoes of the vehicle wheels. This pneumatic servomotor is of a type to be actuated by a pressure differential created by vacuum on one side of a movable wall, as supplied by an engine intake manifold 24, and atmospheric pressure on the other side as supplied from a pressure responsive valve means 26 to the atmosphere inlet 28 of the servomotor 10.

As seen, the engine intake manifold 24 is connected by means of a conduit 30 to a vacuum check valve 32 forming the vacuum inlet for the servomotor 10; whereas the pressure responsive valve 26 is connected by a conduit 34 having a branch 36 opening into a check valve 38 with still another branch 40 leading to the atmospheric inlet 28. Atmospheric air is supplied via a filter 42 connected by conduit 44 to the pressure responsive means 26 at an atmospheric inlet 46 thereof. The pressure responsive means 26 also has an atmospheric air inlet 48, a control chamber reference pressure port 50, a superatmospheric inlet 52 connected by a line 54 to an air compressor 56, and a control pressure port 58 to which the conduit 34 is connected. The control chamber reference pressure port 50 is connected by a conduit 59 to a control chamber port 60 of the servomotor 10.

As will be realized by those skilled in the art to which this invention relates, the brake pedal 12 is connected by means of a push rod 62 to an internal valving mechanism within a movable wall of the servomotor 10 that will be described with reference to FIGURE 2. The servomotor 10 is such that it is normally bolted to the firewall between the engine compartment and the passenger compartment of an automobile by bolts and/or brackets (not shown). The master cylinder 14 is suspended from the servomotor 10.

The servomotor construction is particularly detailed in FIGURE 2 to show a housing comprised of a front shell 64 and a rear shell 66 joined by a twist lock connection as at 68 with a bead 70 of a rolling diaphragm 72 positioned by the front and rear shells to seal the juncture of same. The rolling diaphragm 72 has an inner bead 74 fitting within the recess 76 of a movable wall 78 which divides the housing into a front variable volume chamber 80 and a rear variable volume chamber or control chamber 82. The movable wall 78 is provided with a rearwardly projecting boss 84 which is slidably and sealably supported as at 86 to project rearwardly of the rear shell 66 internally of a rubber boot 88 that is affixed to the rear shell 66 by fitting it over an upset portion 90 of the rear shell which also serves to support the sealing and guiding means 86.

To the front of the wall a hub structure 92 is joined by means of bolts (not shown) that is provided with passages 94, 96 and 98 that open into a valve chamber 100 of the wall 78. Prior to the joining of the hub 92 to the wall 78 a diaphragm type valve 102 is inserted between the wall 78 and the hub 92 to seal the juncture of same. This diaphragm valve comprises a floating valve seat 104 that is urged by the follow-up spring 106 to abut either a movable valve seat 108 attached to the push rod 62 and slidably and sealably supported through the movable wall 78, or upon a fixed valve seat 110 formed in the hub 92 about the opening of the valve chamber 100 to the passages 98 and 94. Thus, as may be readily observed in the drawing, the passage 94 opens to the valve chamber 100 in front of the valve face 104; whereas the passage 96 opens to the rear of the valve chamber 100 behind and within the diaphragm valve 102. Passage 98 communicates with a passage 112 within the wall 78 that opens into the control chamber 82.

A hose 114 connects the control pressure inlet 28 to the hub 92, and a return spring 116 which is designed to counteract the torque of the hose 114 is inserted between the front shell 64 and the movable wall 78 to maintain it in the rearward position shown in absence of a pressure differential thereacross.

The servomotor construction is completed upon the assembly of an output member 118 having a reaction plunger 120 bearing against a reaction disc 122 within the hub 92. The output member 118 projects beyond the front shell 64 into the master cylinder 14 to actuate the master cylinder piston(s) (not shown) and exits the front shell 64 through a bearing or supporting type seal 124 affixed in the inwardly turned section 126 of the front shell 64 on the axis, preferably, of the push rod 62.

With regard to the pressure responsive means for supplying control pressure to the servomotor 10, it is best shown by FIGURE 3 to include a housing comprised of three sections 128, 130 and 132 that are bolted together. First the housing section 132 is provided with a follow-up valve mechanism including a grommet type valve 134 that is held within the housing 132 by a retainer 136 also forming a bearing surface for a valve follow-up spring 138 that on the other hand bears against a reinforcing plate 140 in the grommet type valve 134 to normally urge the grommet type valve to abut valve seat 142 of the housing 132. A movable valve seat 144 is formed on a plunger 146 guided, as at the end 148, in a bore within a plug 150 held by snap ring 152 to sealingly close the open end of the housing 132. The other end of the rod 146 extends beyond the housing 132 into the housing 130 and is supported adjacent the juncture of the housing 130 and 132 by a seal 151 and bearing plate 153 held to the housing 132 by a snap ring 154. Forwardly of the valve seat 144 on the rod 146 a stop flange 156 is provided which bears against a shoulder 158 of the housing 132 to limit the forward movement of the rod 146 so that the end 148 will not be removed from the bore of the plug 150. A recess with an annular seal 160 is provided in the housing 132 so that upon the juncture of these two the seal 160 will prevent the surrounding atmosphere from seeping therebetween.

The next step in assembling the pressure responsive means 26 is to insert a biasing spring 164 within the housing portion 130 and placing a diaphragm support plate 166 thereagainst which is joined with another diaphragm support plate 168 with a diaphragm 170 therebetween, whose peripheral edges 172 seal the juncture of the housing sections 128 and 130, which are assembled by means of bolt 174 to clamp the diaphragm 170 between the plates 168 and 166 as well as join them to the rod 146. Thereafter the housing section 128 is bolted to the housing section 130 creating a control reference pressure chamber 176 and an atmospheric chamber 178 within the housing comprised of the sections 128 and 130.

*Operation*

In operation the driver of the automobile to which the power brake system as seen in FIGURE 1 is installed, will, upon braking depress the brake pedal 12 to cause the movable valve seat 108 to move inwardly with respect to the hub 92 until the valve face 104 "laps" on the seat 110. At this time the vacuum communication via the check valve 32 and the passages 94 passing in front of the valve face 104 to the passage 98 and out the passage 112 to the control chamber 82 is terminated. Further inward movement of the brake pedal 12 will unseat the seat 108 from the valve face 104 whereby control pressure in hose 114 will pass through the valve chamber centrally of the diaphragm valve 102 into the passage 98 and out the passage 112 to the control chamber 82 creating a pressure differential across the movable wall 78 to project the output member 118. This will move the pistons within the master cylinder 14 to provide hydraulic pressure to lines 16 and 18 for actuation of the wheel cylinders 20 and 22, respectively. The control pressure in the hose 114 is derived from the pressure responsive means 26 which, with reference to FIGURE 3, is generally, at first, atmospheric pressure entering via the port 46, in that the control chamber 82, being communicated by line 59 to the chamber 176 will compress the biasing spring 164 to abut the valve seat 144 on the grommet valve 134 and move it away from the seat 142 whereby atmospheric inlet 46 and control pressure port 58 are in communication.

If greater braking pressure is desired, the operator will continue to depress the brake pedal 12 until the movable wall 78 reaches the power run-out position; i.e., this is the position where there has been created the maximum possible differential between atmospheric pressure in chamber 82 and vacuum in chamber 80. Further movement of the output member 118 is normally by means of increased manual effort. Prior to this point of power run-out the control chamber pressure as aforementioned, will be approaching atmospheric lessening the differential across diaphragm 170 whereby spring 164 will begin to "lap" grommet valve 134, and at power run-out will unseat the movable valve seat 144. Superatmospheric pressure from the pump 56 entering via the port 52 will now flow through the valve and out the control pressure port 58 to raise the pressure in the control chamber 82 beyond that of atmosphere whereby further output pressure may be delivered by the servomotor 10 to increase the line pressure for the wheel cylinders 20 and 22.

Upon release of the braking effort permitting the brake pedal 12 to move back to its normal position, the valve return spring 180 (see FIGURE 2) will cause the valve seat 108 to lap on the valve face 104 and remove the valve face 104 thereafter from the valve seat 110 to again communicate vacuum from chamber 80 to the control chamber 82 and via the ports 60 and 50 to the chamber 176 thereby permitting the return spring 116 to return the wall 78 to the position shown by FIGURE 2. Vacuum in chamber 82 creates a pulling action on the diaphragm 170 to again bias the spring 164 to seat the valve seat 144 on the grommet valve 134 and displace it from the seat 142 of the housing section 132.

Having fully described a preferred embodiment of our invention as well as the operation thereof, it is now intended to set forth the protection sought by these Letters Patent as follows.

We claim:

1. A pressure responsive means for controlling communication of a secondary power source to a servomotor normally actuatable by a primary power source, said means comprising:
    a motor including a movable wall biased by a spring, which wall is operably connected to said servomotor such that said spring is compressed until said wall is suspended by said primary power source;
    a valve means controlling communication of said secondary power source to said servomotor; and
    means connecting said wall and said valve means such that upon suspension of said wall said valve means terminates supply of said primary power source and opens supply of said secondary power source to said servomotor.

2. For use with a pneumatic servomotor having a movable wall separating a housing for same into first and second variable volume chambers normally communicated via a valve to suspend said wall in a vacuum with means operatively connected to said valve to close said communication and open atmospheric pressure to said second chamber for actuating said wall, a pressure responsive control device comprising:
    a motor having a piston means in a housing creating third and fourth variable volume chambers one of which is communicated to atmospheric pressure and the other of which is communicated to said second chamber, said motor also including a means to bias said piston means in one direction whenever pressure in said second chamber corresponds to atmospheric pressure;
    a follow-up control valve means operatively connected to said piston means, to, in accordance with the position of said piston means in said housing, control communication of atmospheric pressure to said valve and whenever said piston means is suspended in atmospheric pressure to control communication of superatmospheric pressure to said valve.

3. A pressure responsive valve operatively connected to a control chamber of a pneumatic servomotor whose pressure is regulated by an operator-operated valve normally controlling supply of atmospheric pressure from a source to said control chamber, said pressure responsive valve comprising:
    a motor including a spring biased wall creating first and second variable volume chambers, one of which is open to atmosphere opposite the side of said wall upon which said spring bears and the other of which is communicated to said control chamber;

a follow-up valve mechanism between a source of the atmospheric pressure and a source of superatmospheric pressure and said operator-operated valve; and means connecting said motor and said follow-up valve mechanism whereby said motor controls whether atmospheric pressure or superatmospheric pressure is communicated to said operator-operated valve.

4. A pressure responsive valve according to claim 3 and further comprising a check valve between the communication of said follow-up valve mechanism and said operator-operated valve controlling an atmosphere inlet forming a secondary atmospheric source.

5. A vacuum suspended servomotor comprising:

a housing having a vacuum inlet and a control pressure inlet;

a movable wall in said housing having passage means leading from one side of said servomotor to the other with a valve chamber therebetween, said passage means having separate portions connected respectively to said vacuum inlet and said control pressure inlet;

a follow-up valve mechanism in said valve chamber normally communicating vacuum to suspend said wall while blocking said control pressure inlet from a control chamber on one side of said movable wall;

remotely controlled means for operating said follow-up valve mechanism to sequentially terminate vacuum suspension and open said control pressure inlet to said control chamber; and pressure responsive means operatively connected to said control chamber and said control pressure inlet to automatically change from a primary pressure source for said control pressure inlet to a secondary greater pressure source as said movable wall approaches power run-out with said primary pressure source.

6. The structure of claim 5 and further comprising a check valve between said pressure responsive means and said control pressure inlet to permit supply of said primary source from other than said pressure responsive means in the event of failure thereof.

7. The structure of claim 5 wherein said pressure responsive means comprises:

a housing having first and second atmospheric pressure inlets, a superatmospheric inlet, a control chamber pressure reference port and a control pressure outlet port;

a diaphragm operatively arranged in said housing between said first atmospheric inlet and said control chamber pressure reference port;

a follow-up valve mechanism in said housing between said second atmospheric pressure inlet, said superatmospheric pressure inlet and said control pressure outlet port which follow-up valve mechanism is operatively connected to said diaphragm to normally close off communication of said superatmospheric inlet while opening said second atmospheric inlet to said control pressure port; and means operatively connected to said diaphragm to move same to close said second atmospheric inlet and open said superatmospheric inlet to said control pressure whenever said control chamber pressure reaches atmospheric pressure whereby said diaphragm is suspended in atmospheric pressure.

References Cited

UNITED STATES PATENTS 3,353,451  11/1967  Garrison et al. _____ 91—6
3,357,310  12/1967  Rohde _____ 91—6

JOHN J. CAMBY, *Primary Examiner.*